United States Patent [19]
Gibbs

[11] Patent Number: 5,956,119
[45] Date of Patent: Sep. 21, 1999

[54] GLASSES ATTACHMENT FOR A PROTECTIVE MASK

[75] Inventor: David Gibbs, 13 Richmond Road, Ottawa, Ontario, Canada, K1Y 2X1

[73] Assignee: David Gibbs, Nepean, Canada

[21] Appl. No.: 09/204,509

[22] Filed: Dec. 4, 1998

Related U.S. Application Data

[63] Continuation-in-part of application No. 08/891,724, Jul. 14, 1997.

[30] Foreign Application Priority Data

Jul. 14, 1998 [CA] Canada ................................. 2243194

[51] Int. Cl.⁶ ...................................................... G02C 1/00
[52] U.S. Cl. .................................................. 351/158; 2/9
[58] Field of Search ............................... 351/158; 2/9, 13

[56] References Cited

U.S. PATENT DOCUMENTS

| | | | |
|---|---|---|---|
| 3,991,753 | 11/1976 | Viesca y Viesca | 351/158 |
| 4,821,340 | 4/1989 | Johnson | 351/158 |
| 4,843,643 | 7/1989 | Parissenti et al. | 2/13 |
| 4,944,039 | 7/1990 | Dietrich | 2/13 |
| 5,424,787 | 6/1995 | Zegarelli | 351/111 |
| 5,797,146 | 8/1998 | Matich | 351/158 X |

*Primary Examiner*—Huy Mai
*Attorney, Agent, or Firm*—Neil Teitelbaum & Associates

[57] ABSTRACT

A positionable face mask support for attaching to a pair of glasses. The positionable face mask support is adaptable to be used with any pair of glasses for protecting individuals who work with bodily fluids of humans or animals from direct contact with such fluids. The positionable face mask support comprises attachments, releasable latching members and biasing means for attaching to the face mask and allowing the face mask to be positioned in one of a plurality of positions ranging from being against a wearer's face to being substantially lifted away from the wearer's face. The mask support further comprises flexible members depending therefrom for attaching to cheek portions of the face mask and for conforming to the wearer's face.

20 Claims, 6 Drawing Sheets

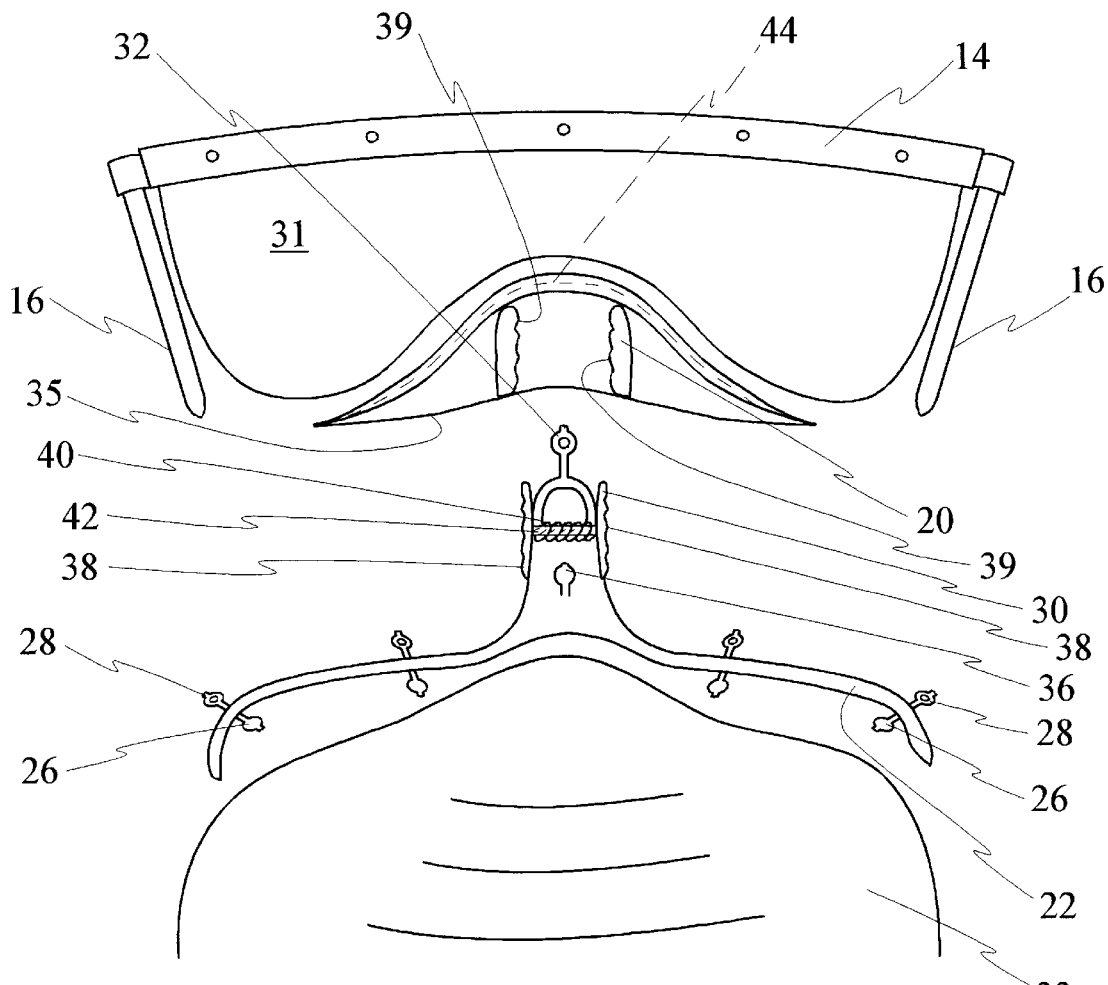
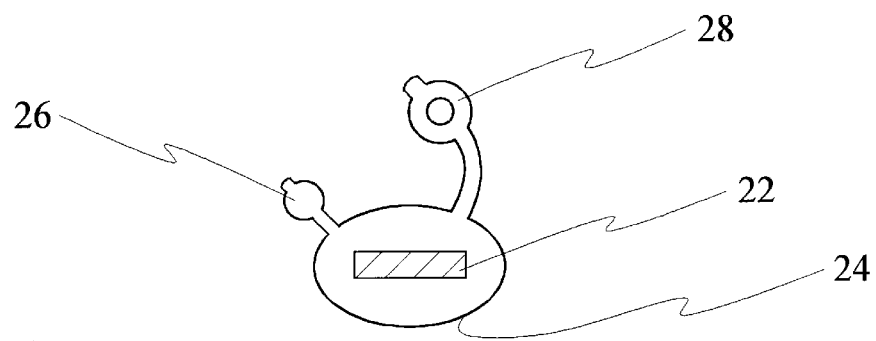

GLASSES ATTACHMENT FOR A PROTECTIVE MASK

This application is a Continuation-in-Part Application of Application Ser. No. 08/891,724 filed Jul. 14, 1997.

FIELD OF THE INVENTION

This invention relates generally to a glasses attachment for use with a protective mask, and more particularly to a glasses attachment having means for supporting a mask in a plurality of positions.

BACKGROUND OF THE INVENTION

Individuals who work with bodily fluids of humans or animals must be protected from direct contact with such fluids. The risk of contacting infectious diseases by contact with bodily fluids of diseased humans and animals has necessitated the use of protective devices such as protective eye glasses and masks, so that doctors and dentists and other medical personnel do not come into direct contact with such fluids. In addition to gowns, gloves, most individuals subject to such exposure wear medical face masks, goggles and/or breathing devices to some degree, which are uncomfortably warm and muffle to some extent the users' speech. Conventional, commercially available masks, such as one made by 3M having an elastic band attached thereto for placement around the back of a user's head and generally over his/her ears, is found by many to be uncomfortable, due to the stretched elastic band rubbing over the ears of the wearer.

U.S. Pat. No. 4,821,340 in the name of Johnson discloses a face shield to protect an individual against inhaling germs and other foreign bodies, comprising a permanent clip portion which is adapted to be mounted on the nose piece of a pair of eyeglasses, and a disposable sheet of a relatively thin rigid sheet of plastic which is removably attached to the clip. Unfortunately, Johnson's face shield provides little or no opportunity for a wearer to lift off the mask partially without complete removal. Attachment of the mask is somewhat complex and thus there exists a need for an arrangement wherein the mask can be partially lifted off the face in a convenient and uncomplicated manner.

U.S. Pat. No. 4,944,039 in the name of Dietrich issued Jul. 31, 1990 discloses a protective mask attachable to glasses. The mask comprises a thin frame to cross transversely over the bridge of the nose, below the eyes and across the cheeks of the user; a protective cover is attached to the frame to hang freely in front of the nose and mouth of the user. The frame is attached to the glasses by attachment hooks. Although Dietrich's mask may perform its intended function, it has several limitations. Firstly, it is not adjustable into a plurality of positions. Secondly, it is not suitable for coupling with a commercially available disposable face mask, such as one manufactured by 3M Dental Products Division in the United States sold under the name Fluid Resistance Molded Face Mask, model number 1942FB.

Zegarelli, in a more recent U.S. Pat. No. 5,424,787 issued on Jun. 13, 1995 discloses a pair of glasses that comprises attachment pieces formed on the temple pieces anterior of the eyeglasses ear pieces for attachment of non-rigid support ties of a non-rigid face mask. Although this invention likely performs its intended function, it lacks certain advantages provided by the glasses for supporting a mask disclosed herein, in accordance with this invention. For example, when the wearer becomes to warm under the mask, or wishes to converse in a less constrained manner, the instant invention provides means of partially lifting the mask from the wearer's face without entirely removing the mask.

It is an object of the invention to overcome some of these disadvantages by providing a mask support in the form of a pair of glasses having a single transparent shield or a pair of lenses and including means for attaching to a mask and for supporting a mask in a plurality of positions.

It is an object of the invention to overcome the use of an elastic band for securing a mask in a working position onto the face of a person. It is a further object of the invention to provide alternate means of supporting such a mask on a pair of glasses, without obstructing the view of the wearer, said means being movable into a plurality of positions for positioning the mask near or partially lifted off of the wearer's face.

It is a further object of the invention to provide a glasses attachment having means for attaching to a mask and for supporting a mask in a plurality of positions.

SUMMARY OF THE INVENTION

In accordance with the invention there is provided a pair of glasses for supporting a protective face mask comprising: a positionable mask support coupled with and relatively moveable with the pair of glasses for allowing the protective face mask supported therefrom to be positioned and held in one of a plurality of positions ranging from a first position being against a wearer's face to at least a second position being substantially lifted away from the wearer's face.

In accordance with the invention there is further provided a mask support for use with a pair of glasses having a frame and a lens for protecting the eyes of a wearer comprising: releasable latching means relatively movable with and in use being coupled with the pair of glasses, for removably attaching and supporting a mask beneath said lens, and for holding the mask in a plurality of adjustable positions ranging from substantially against to partially lifted off a wearer's face.

In accordance with an embodiment of the invention there is provided a pair of eyeglasses having a pair of lenses or a lens shield for supporting a face mask comprising: an adjustable mechanism depending from the pair of eyeglasses and relatively movable with the pair of eyeglasses for supporting the face mask, said adjustable mechanism including a primary attachment member for releasably attaching to a medial upper portion of the face mask, said adjustable mechanism for supporting the face mask being adjustable into a plurality of positions when the face mask is in the attached position supported by the pair of eyeglasses to allow raising or lowering of the face mask away from or toward a wearer's face.

BRIEF DESCRIPTION OF THE DRAWINGS

Exemplary embodiments of the invention will now be described in conjunction with the drawings, in which:

FIG. 6 is a front view of the glasses, the face mask support/adjustable mechanism and the face mask shown disassembled;

FIG. 7 is a cross sectional view of the moldable arms for attaching to cheek sections of the face mask having a protective plastic cover with face mask attachment members;

DETAILED DESCRIPTION

Figure 1A:
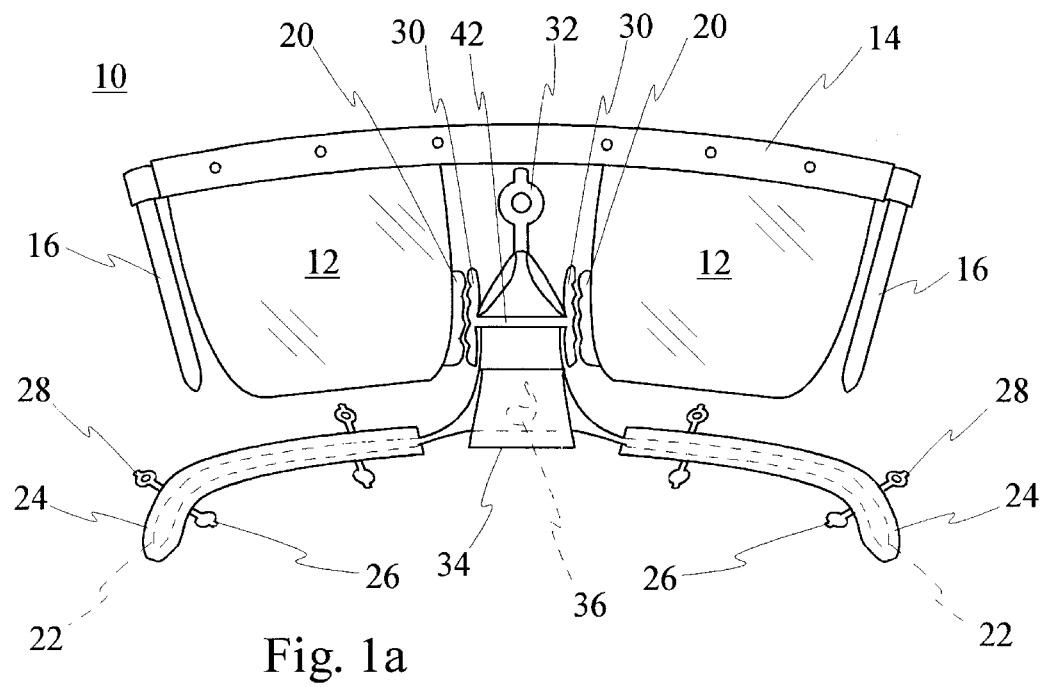
FIG. 1a is a front view of a pair of glasses in accordance with the invention.
Figure 1B:
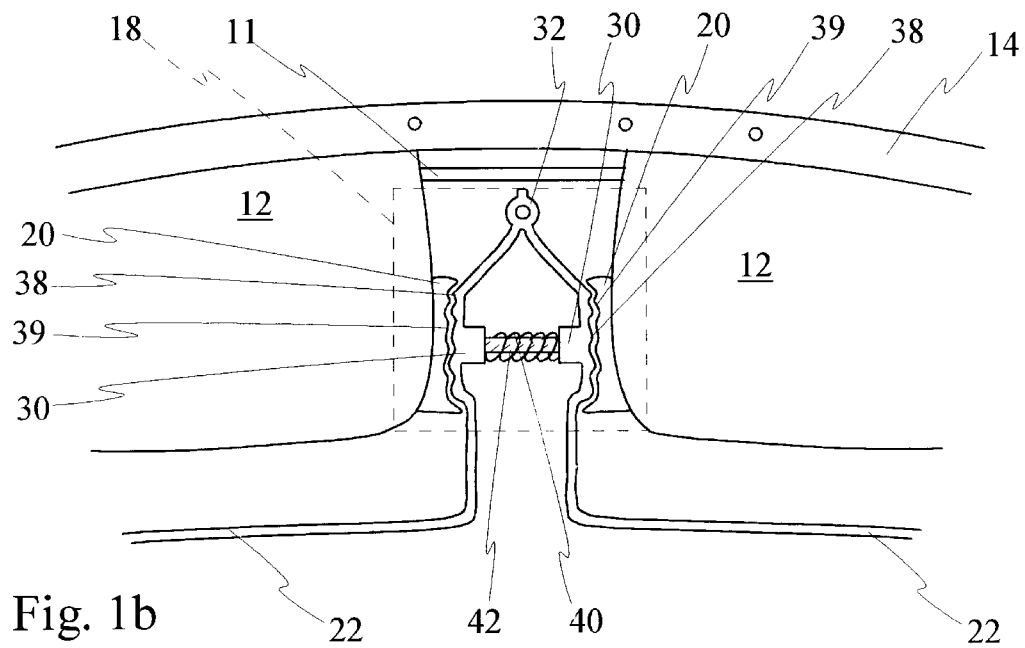
FIG. 1b is a view of the discs including an adjusting arm and moldable arms for attaching to cheek portions of the face mask.
Figure 1C:
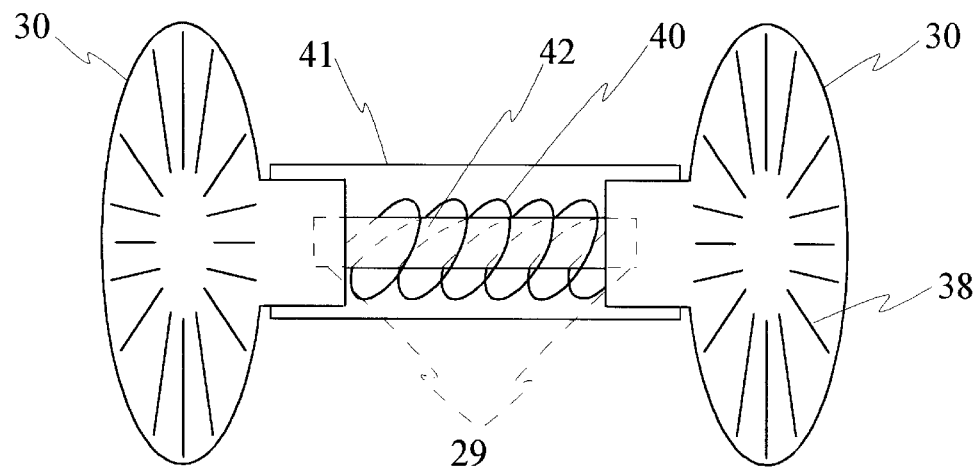
FIG. 1c is an illustration showing in more detail than FIG. 1a, the spring biased discs.
Figure 1D:
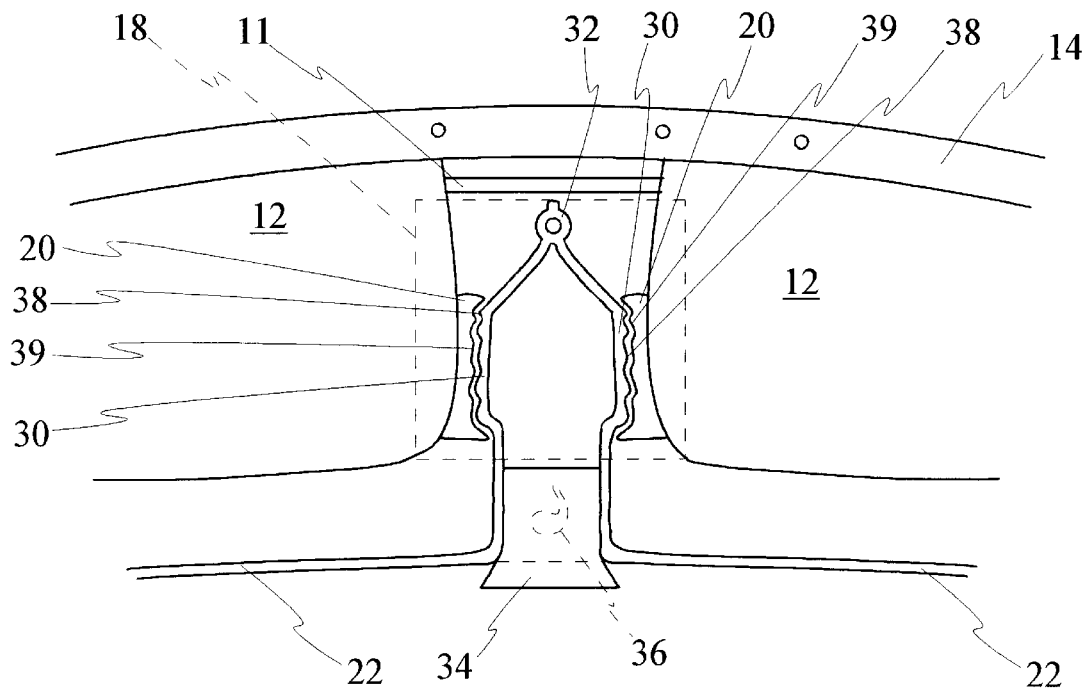
FIG. 1d is a view of the discs including an adjusting arm, moldable arms for attaching to cheek sections of the face mask, and a central clasp having a prong and a cover.

Referring now to FIGS. 1a–d and more particularly to FIG. 1a, a pair of glasses 10 in accordance with the invention is shown, having a pair of protective lenses 12, supported by a frame 14 including temple arms 16 for carrying the pair of glasses 10 adjacent the wearer's temples and over the ears. The pair of glasses 10 comprises an adjustable mechanism 18 as shown in FIGS. 1b and 1d disposed below a bridge portion between the lenses 12 of the pair of glasses 10. The adjustable mechanism 18 is used for attaching to and supporting a face mask (not shown) to the pair of glasses 10 and hence serves as an adjustable or positionable face mask support. When the face mask is attached to the adjustable mechanism 18 supported by the pair of glasses 10 then the adjustable mechanism 18 allows the position of the face mask to be adjusted/positioned into a plurality of positions to allow raising or lowering of the face mask away from or toward a wearer's face.

If desired, the adjustable mechanism 18 serves as the bridge for the pair of glasses 10 when it is disposed below the bridge portion between the pair of protective lenses 12 as shown in FIG. 1a. Alternatively, as shown in FIGS. 1b and 1d, the adjustable mechanism 18 is disposed in addition to a bridge 11 between the pair of protective lenses 12.

The adjustable mechanism 18 is shown in more detail in FIG. 1c and will be explained hereinafter.

Figure 2:
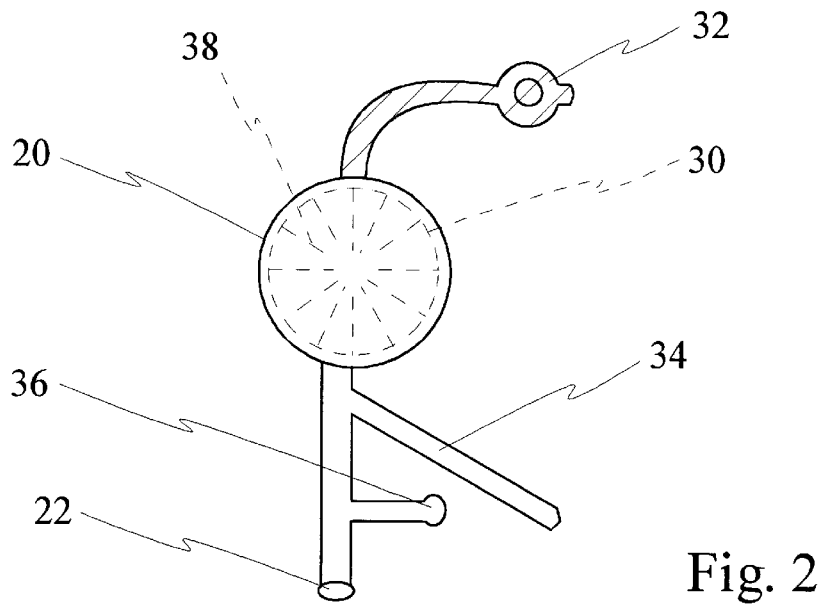
FIG. 2 is a close-up side view of the adjustable mechanism shown in FIGS. 1a and 1b for retaining a face mask and permitting adjustment/positioning thereof.

In a preferred embodiment of the invention a central clasp having a primary attachment member/prong 36 and a cover 34 is connected to the adjustable mechanism 18. The central clasp is disposed between and below the pair of lenses 12 and below the adjustable mechanism 18. This central clasp is adapted to removably snap onto a medial upper portion of the face mask. FIG. 2 shows this central clasp in more detail. Extending from the lower portion of the central clasp is a pair of moldable members 22 in the form of wire arms branching therefrom. Alternatively, a plastic material is used that can be heat molded to conform to the face of the wearer and that when cooled will stay conformed to the wearer's face. A protective sleeve 24, such as a plastic sleeve, covers the moldable arms 22 and has complementary plastic snaps 26 and 28 depending therefrom for removably attaching to cheek portions of the face mask. Alternatively, in an embodiment of the invention when no central clasp is present the moldable arms 22 extend from the lower portion of the adjustable mechanism 18 as depicted in FIG. 1b. The moldable arms 22 are flexible enough to be shaped and molded to conform to a wearer's face, ensuring a relatively tight seal against the portion of the face adjacent the protective sleeve 24 when the face mask is adjusted in the most downward position, i.e. the face mask is lowered toward the wearer's face.

The adjustable mechanism 18 as shown in FIG. 1c comprises a releasable latching means or locking means in the form of a pair of biased plastic discs 30 at both ends of a bar 42; the discs 30 have splines 38 along their outward faces and are disposed within a partially open housing 20 having complementary recesses 39, shown in FIGS. 1b and 1d, adapted to contain the biased discs 30 and accept and mate with the splines 38. The discs 30 are always tensioned against the recesses 39 in the housing 20. An adjusting arm 32 coupled with bar 42 or the discs 30 is used to move the discs 30 into another position and as a result the moldable arms 22 move thereby adjusting the position of the face mask. If a sufficient force is supplied to the spring 40 which biases the discs 30 with their splines 38 into the complementary recesses 39 of the housing 20, then the adjustable mechanism 18 is removable from the pair of glasses and thus the biased discs 30 with their splines 38 constitute releasable latching means or locking means.

FIG. 1c shows an embodiment of the invention in which the splines 38 of the discs 30 are ready to be biased against the recesses 39 in the housing 20; a biasing means in the form of a spring 40 is housed within a loosely coupled protective plastic sleeve 41. Both, FIG. 1b and FIG. 1c show more clearly that disposed within the core of the spring 40 is a bar 42 serving as a spring retainer and an axle about which the adjustable mechanism 18 rotates. The bar 42 is loosely coupled within recesses 29 in the discs 30. The biased discs 30 prevent the adjustable mechanism 18 from inadvertently being adjusted and thus maintain a selected position until the discs are forced into a new position by means of an adjusting arm 32.

FIGS. 1b and 1d show that a bridge 11 is disposed between the two lenses to provide additional support for the positionable face mask support in form of the adjustable mechanism 18.

FIG. 1d shows another embodiment in accordance with the invention in which the discs 30 are biased against the recesses of the housing 20 by means of pressure. The wishbone-like adjusting arm 32 is directly coupled with the discs 30 and forces the discs 30 into the recesses 39 of the housing 20. Below the adjustable mechanism 18 for positioning the face mask is a central clasp having a prong 36 and a cover 34 for attaching to a medial upper portion of the face mask. The moldable arms 22 extend from both sides of the central clasp to the cheek portions of a wearer's face.

Referring now to FIG. 2, a profile of the mechanism 18 is shown and the cover 34 is in the open position prior to a face mask being inserted. Above the discs 30 is an adjusting arm 32 in the form of a lever having an outwardly forked shaped base designed to rotate the discs 30 to a different position within the housing 20 upon the application of upward or downward force to the arm 32 thereby allowing adjustment of the adjustable mechanism 18 and the face mask carried by this adjustable mechanism 18 toward or away from a wearer's face. The spring is designed to provide sufficient tension upon the discs 30 to hold the face mask in a selected position during use; however, the spring should also allow adjustment of the face mask into a different position upon sufficient force to the arm 32.

Figure 3:
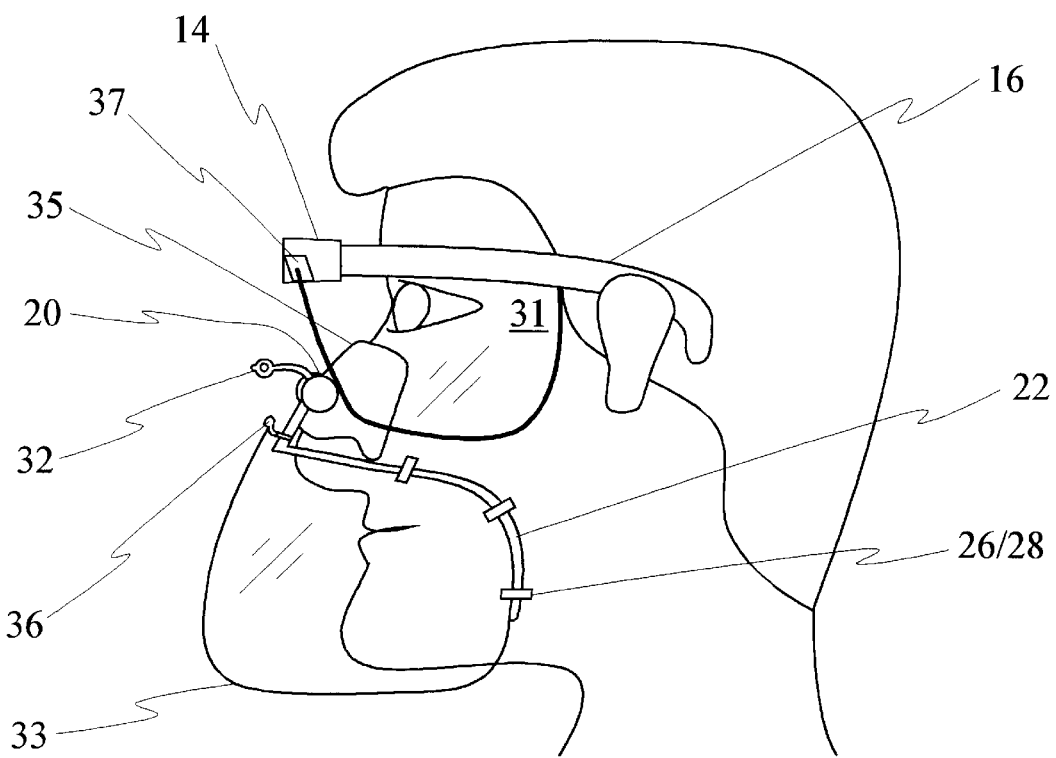
FIG. 3 is a diagram showing separately, various components of the invention positioned over a wearer's face including a face mask in an attached position.

Turning now to FIG. 3, an alternative embodiment in accordance with the invention is shown wherein a pair of glasses is illustrated comprising a single lens or shield 31 and a lower glasses frame bridge portion 35 for accommodating the adjustable mechanism 18. A similar single lens 31 arrangement is shown in detail in FIG. 6. The lower glasses frame bridge portion 35 includes a housing 20 as shown in FIG. 1a, for accommodating the discs 30 of the adjustable mechanism 18. The spring 40 is disposed between the discs 30 and is housed within a flexible tube. Normally, the spring tension forces the discs 30 having grooves or protrusions therein into complementary protrusions or recesses in the housing 20 such that a releasable locking is provided. The medial upper portion of the face mask 33 is attached to prong 36 and the cheek portions of the face mask 33 are attached to the moldable arms 22 through complimentary snaps 26 and 28 which are shown in a closed position. FIGS. 6 and 7 also illustrate in more detail the snaps comprising male and female plastic portions 26 and 28 respectively. The moldable arms 22 are shown to be shaped to conform to the wearer's face. The frame 14 of the glasses has a slot 37 for accommodating the lens 31. The lens 31 is inserted into the frame 14 at an angle away from the eyes of the wearer to allow regular prescription spectacles to be worn underneath the protective glasses. FIG. 3 depicts the face mask 33 in an attached position to the pair of glasses including the single shield/lens 31. The face mask 33 attached to the pair of glasses through the adjustable mechanism 18 is supported by the frame 14 including temple arms 16 for carrying the pair of glasses adjacent the wearer's temples and over the ears.

Figure 4:
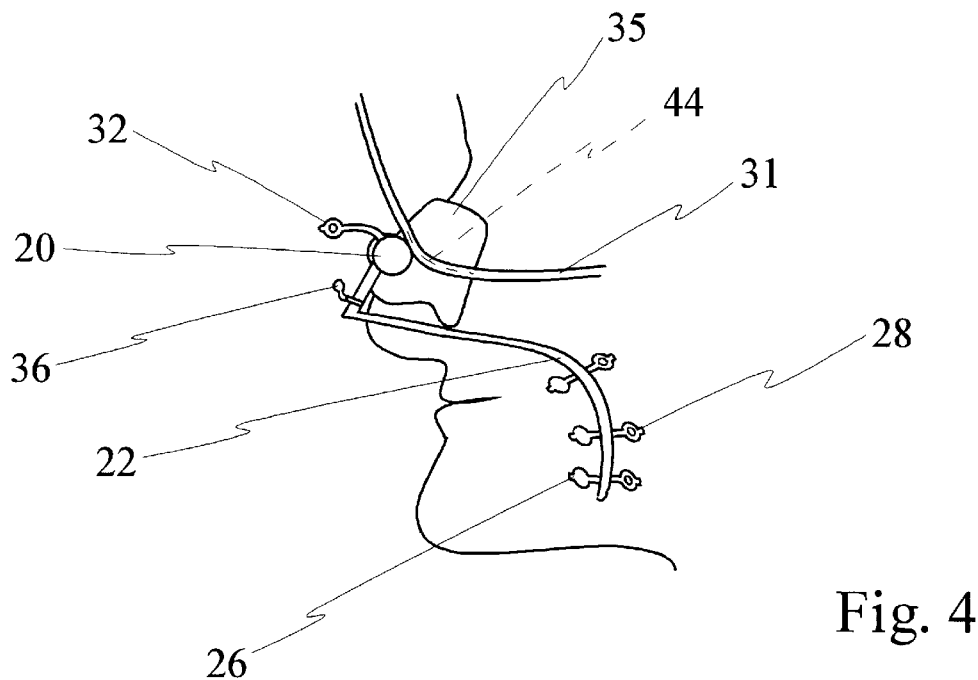
FIG. 4 is a diagram illustrating a part of the shield over a wearer's face, the shield being angled so as to provide space for a pair of spectacles.
Figure 5A:
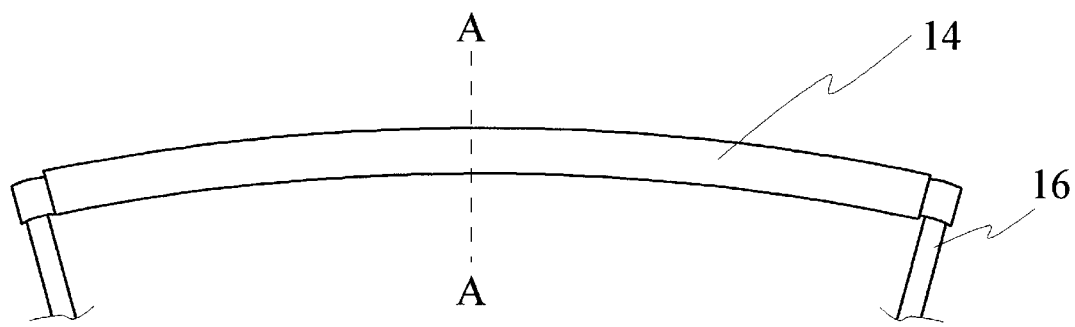
FIG. 5a is view of the upper rim of the frame for supporting the face shield.
Figure 5B:
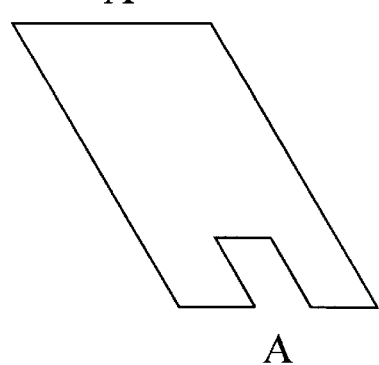
FIG. 5b is a cross sectional view of the face shield taken through the lines A—A, angled to be held away from a forehead.

The embodiment of the invention as shown in FIG. 3 is presented with more detail in FIGS. 4 and 5a and 5b wherein the frame 14 supporting the shield/lens 31 is angled in such a manner as to extend and secure the protective lens 31 away from the user's forehead and face. By so doing, sufficient space is provided between the protective lenses and the eyes of the user, to accommodate the inclusion of a pair of prescription spectacles to be worn underneath the lens 31. As shown in FIG. 4, the nose rest or lower glasses frame bridge portion 35 has a slot 44 for receiving the lens/shield 31 therein. FIG. 5a is a view of the upper rim of the frame 14 for supporting the lens/shield 31 and FIG. 5b is a cross sectional view of the frame 14 taken through the lines A—A showing in more detail how the lens 31 is angled to be held away from the forehead of a wearer when the lens/shield 31 is fitted in the frame 14.

Although embodiments described and shown heretofore are concerned with a specialized pair of protective glasses including a face mask supporting mechanism that allows the face mask to be adjusted into one of a plurality of positions, numerous other embodiments may be envisaged without departing from the spirit and scope of the invention. For example, the mechanism 18 described heretofore may be adapted to be attachable to a pair of conventional spectacles, thereby obviating the protective lens/shield 31 or the pair of lenses 12 and its support structure. This can be achieved by removably coupling the adjustable mechanism 18 to a lower frame of conventional spectacles with a plurality of U-shaped attachment clips made of spring steel biased toward one position. Furthermore, additional support can be provided by attaching to one of the bridge and the temple arms of the spectacles.

FIG. 6 provides a detailed view of the two main portions of the device in accordance with the invention shown separated from one another in order to illustrate the adjustable mechanism 18 in greater detail. The nose rest or lower glasses frame bridge portion 35 is shown to support the housing 20 with complementary recesses 39 therein for receiving the discs 30 having splines 38 as indicated by the wavy line facing the outside of the discs 30. The nose rest 35 is attached to the lens/shield 31 through slot 44. The cheek guard or moldable arms 22 extend from below the discs 30. The prong 36 is for attaching to the medial upper portion of the face mask 33. The complementary snaps 26 and 28 are for attaching the moldable arms 22 to the cheek portions of the face mask 33. This view more clearly illustrates the relationship between the lower face mask supporting member resembling a wishbone having outwardly biased disks attached thereto. As the discs 30 with their splines 38 are rotated by moving the adjusting arm 32 through sufficient force, the moldable arms 22 are moved therewith and thus the face mask is positioned. Depending on what kind of position of the face mask 33 with respect to the wearer's face is desired, the adjusting arm 32 is moved to allow raising or lowering of the face mask 33 away from or toward a wearer's face.

Referring now to FIG. 7, a cross sectional view of the moldable arms 22 for attaching to cheek sections of the face mask 33 is presented. The moldable arms 22 have a protective plastic cover 24 with face mask attachment members depending therefrom. The face mask attachment members include complementary male and female snaps 26 and 28, respectively, for removably attaching the moldable arms 22 to the cheek portions of the face mask 33. Alternatively, velcro strips can be applied to the face mask and the moldable arms 22 to secure one to the other. Or, yet alternatively, a tightly fitting C-shaped sleeve can be provided to secure the edge of the upper portion of the face mask 33 with the moldable arms 22.

Figure 8:
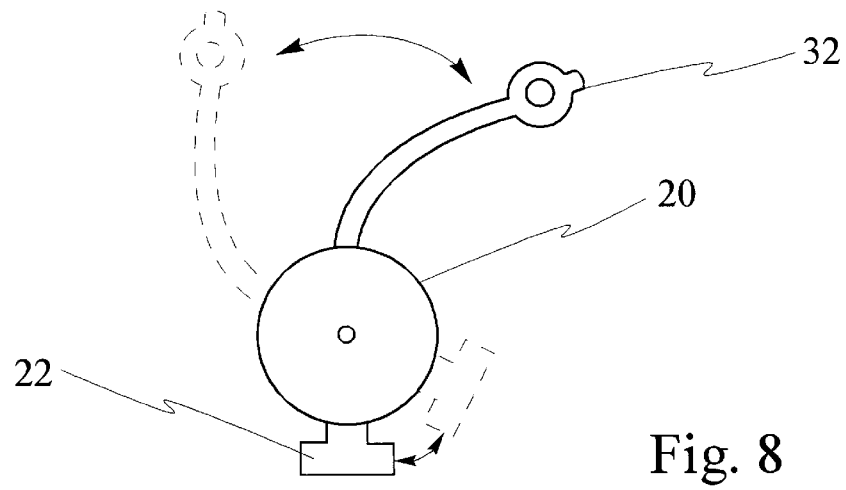
FIG. 8 is a side view of a portion of the face mask support/adjustable mechanism shown in a first position in solid outline and in a second position in dashed outline.

Turning to FIG. 8 which represents a side view of a portion of the adjustable mechanism 18, a greater understanding of the variable positions of the adjustable mechanism 18 can be seen. A first position of the adjustable mechanism 18 is indicated by a solid line and a second position of the adjustable mechanism 18 is indicated with a dashed line, the adjustable mechanism 18 being positioned by moving the adjusting arm 32 through sufficient force.

Figure 9:
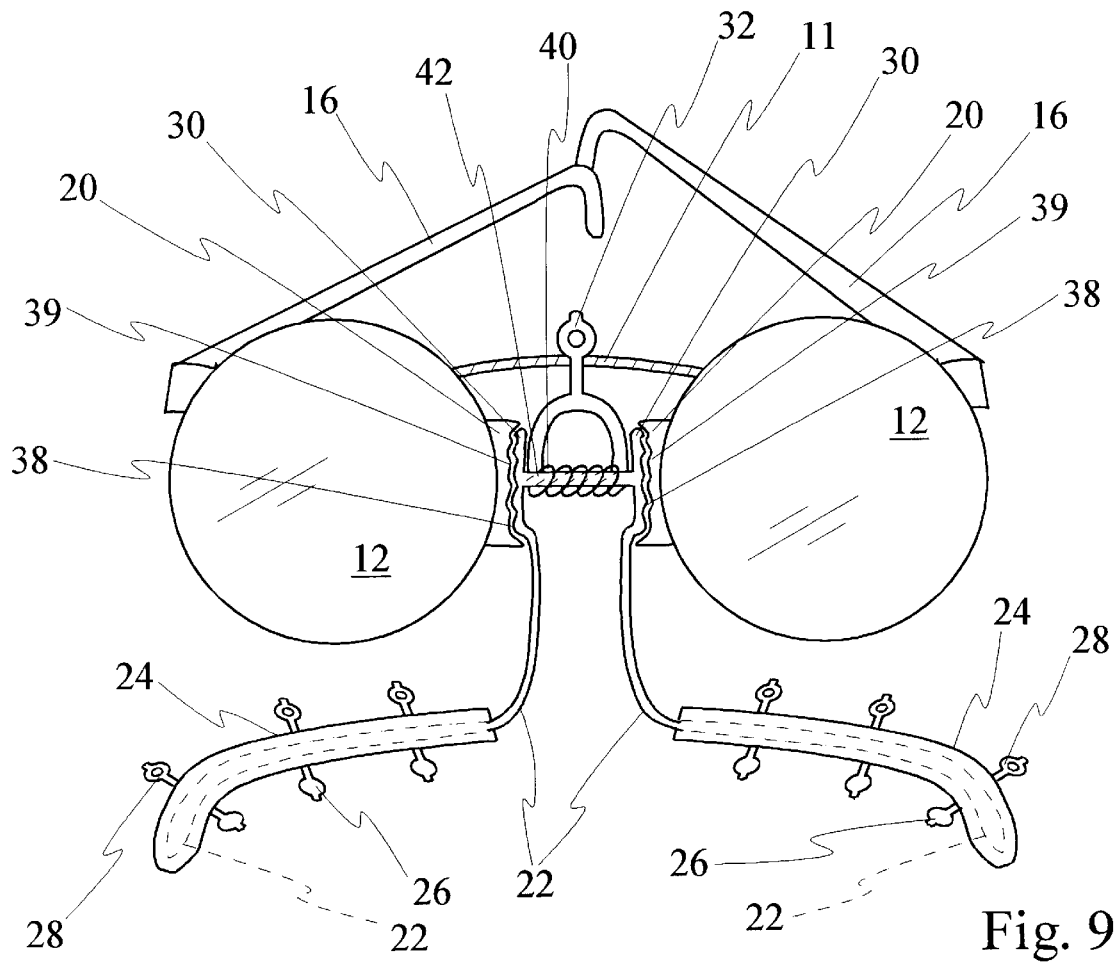
FIG. 9 shows an alternative embodiment of the invention in which the positionable face mask support of the instant invention is coupled to a regular pair of spectacles.

Referring to FIG. 9 an alternative embodiment of the invention is shown in which the positionable face mask support/adjustable mechanism 18 of the instant invention is coupled to a regular pair of spectacles. As shown in FIG. 9, the positionable face mask support is disposed under a bridge between the lenses for supporting a face mask depending therefrom in a plurality of positions which is conveniently adjustable by the wearer, i.e. the mask can be releasably adjusted in a variety of positions ranging from being against a wearer's face to being substantially lifted away from the wearer's face.

Various other means may be envisaged for movably securing the adjustable mechanism 18 into one of a plurality of fixed positions. For example in an alternative embodiment not shown, the adjustable mechanism 18 and discs 30 attached thereto, may be fixed wherein the biasing is provided within the housing 20 receiving the discs 30. Alternatively, other releasable latching or locking means may be used.

What is claimed is:

1. A pair of glasses for supporting a protective face mask comprising:

a positionable mask support coupled with and relatively moveable with the pair of glasses for allowing the protective face mask supported therefrom to be positioned and held in one of a plurality of positions ranging from a first position being against a wearer's face to at least a second position being substantially lifted away from the wearer's face.

2. The pair of glasses as defined in claim 1, wherein the positionable mask support comprises releasable latching members for releasably adjusting and holding a selectable position of the protective face mask, the releasable latching members being coupled with the glasses.

3. The pair of glasses as defined in claim 2, wherein the positionable mask support further comprises moldable members depending therefrom and extending to cheek portions of a face, the moldable members having attachments for attaching to cheek portions of the protective face mask, the moldable members being coupled with the releasable latching members.

4. The pair of glasses as defined in claim 3, wherein the moldable members are moldable for conforming to the wearer's face.

5. The pair of glasses as defined in claim 2, wherein an adjusting arm is coupled with the releasable latching members for applying a force to the releasable latching members to adjust the position of the releasable latching members.

6. The pair of glasses as defined in claim 2, wherein the releasable latching members are held in place by pressure through a biasing means.

7. The pair of glasses as defined in claim 6, wherein the biasing means is a spring.

8. The pair of glasses as defined in claim 5, wherein the position of the releasable latching members is adjusted for adjusting the position of the protective face mask coupled therewith.

9. A mask support for use with a pair of glasses having a frame and a lens means for protecting the eyes of a wearer comprising:

releasable latching means relatively movable with and in use being coupled with the pair of glasses, for removably attaching and supporting a mask beneath said lens means, and for holding the mask in a plurality of adjustable positions ranging from substantially against to partially lifted off a wearer's face.

10. The mask support as defined in claim 9, wherein the releasable latching means is relatively movable with and coupled to at least one of said frame and said lens means includes a pair of discs relatively biased against a portion of one of the frame and the lens means, said pair of discs having moldable members extending therefrom for holding the mask.

11. The mask support as defined in claim 10, further comprising a housing extending from one of the frame and the lens means for accommodating the pair of discs.

12. The mask support as defined in claim 9, wherein said lens means comprises two separate lenses, and wherein the frame holds the lenses in a fixed position; said releasable latching means relatively movable with and coupled to said frame being adjacent to and movably coupled below a bridge portion of the frame.

13. The mask support as defined in claim 9, comprising arms for extending above or over the cheeks of a wearer, said arms coupled with said releasable latching means relatively movable with and coupled to said frame, said arms being of a material that will conform to contours of the wearer's face.

14. The mask support as defined in claim 13, wherein said arms include attachment means for removably attaching to portions of the mask and for further supporting the mask.

15. A pair of eyeglasses having a pair of lenses or a lens shield for supporting a face mask comprising:

an adjustable mechanism depending from the pair of eyeglasses and relatively movable with the pair of eyeglasses for supporting the face mask, said adjustable mechanism including a primary attachment member for releasably attaching to a medial upper portion of the face mask, said adjustable mechanism for supporting the face mask being adjustable into a plurality of positions when the face mask is in the attached position supported by the pair of eyeglasses to allow raising or lowering of the face mask away from or toward a wearer's face.

16. The pair of eyeglasses as defined in claim 15 wherein the adjustable mechanism is coupled with the pair of lenses or the lens shield.

17. The pair of eyeglasses as defined in claim 15, comprising moldable members adjacent the primary attachment member and below the pair of lenses or the lens shield for forming to and conforming to the wearer's face.

18. The pair of eyeglasses as defined in claim 17, further comprising:

a plurality of face mask attachment members adjacent the moldable members for releasably attaching to cheek portions of the face mask.

19. The pair of eyeglasses as defined in claim 15, wherein the adjustable mechanism coupled with the pair of lenses or the lens shield for supporting the face mask includes at least a biasing member coupled with the primary attachment member for releasably holding the face mask in a plurality of supported positions ranging from against a face, to partially lifted off the face.

20. The pair of eyeglasses as defined in claim 19, wherein the biasing member biases a pair of discs that include complementary engaging surfaces to secure the mask releasably in one of a plurality of adjustable positions when the adjustable mechanism is coupled with the pair of eyeglasses.

* * * * *